US012665325B2

(12) United States Patent
Berghahn et al.

(10) Patent No.: US 12,665,325 B2
(45) Date of Patent: Jun. 23, 2026

(54) CONNECTION ASSEMBLY, CONNECTION CLAMP AND ELECTRONIC DEVICE

(71) Applicant: PHOENIX CONTACT GMBH & CO. KG, Blomberg (DE)

(72) Inventors: Kevin Berghahn, Blomberg (DE); Martin Gebhardt, Lage (DE); Heinz Reibke, Bad Salzuflen (DE); Michael Reineke, Steinheim (DE); Ralph Hoppmann, Bad Oeynhausen (DE); Viktor Bub, Paderborn (DE); Karsten Nolte, Lemgo (DE); Olaf Schyrocki, Bad Pyrmont (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 333 days.

(21) Appl. No.: 18/576,113

(22) PCT Filed: Jun. 30, 2022

(86) PCT No.: PCT/EP2022/068032
§ 371 (c)(1),
(2) Date: Jan. 3, 2024

(87) PCT Pub. No.: WO2023/280670
PCT Pub. Date: Jan. 12, 2023

(65) Prior Publication Data
US 2024/0332826 A1 Oct. 3, 2024

(30) Foreign Application Priority Data
Jul. 6, 2021 (DE) ..................... 10 2021 117 396.5

(51) Int. Cl.
*H01R 4/48* (2006.01)

(52) U.S. Cl.
CPC ........... *H01R 4/483* (2023.08); *H01R 4/4811* (2023.08); *H01R 4/4821* (2023.08)

(58) Field of Classification Search
None
See application file for complete search history.

(56) References Cited

U.S. PATENT DOCUMENTS 10,283,880 B2 * 5/2019 Kettern .................. H01R 4/483

FOREIGN PATENT DOCUMENTS

CN 111786142 A * 10/2020 ........... H01R 4/4828
DE 102019102646 A1 * 8/2020 ............ H01R 4/483

(Continued)

*Primary Examiner* — Tho D Ta
(74) *Attorney, Agent, or Firm* — LEYDIG VOIT & MAYER, LTD.

(57) ABSTRACT

A connection assembly for connecting an electrical conductor includes: a current bar; a clamping spring having a holding leg and a clamping leg, the conductor to be connected being clampable against a clamping section of the current bar by the clamping leg, with the clamping spring in a clamping position; an actuating element linearly guidable along an actuation direction and by which the clamping spring is transferrable from the clamping position into an open position, the actuating element being braced, in the open position, with the clamping spring and holding the clamping spring in the open position, as a bracing; and a rotatably-mounted lever element for acting upon the actuating element to actuate the actuating element.

19 Claims, 8 Drawing Sheets

(56) References Cited

FOREIGN PATENT DOCUMENTS

| | | | | | |
|---|---|---|---|---|---|
| LU | 93148 | B1 | * | 1/2018 | ............... H01R 9/24 |
| WO | WO-2021047974 | A1 | * | 3/2021 | ............. H01R 4/483 |
| WO | WO-2021099175 | A1 | * | 5/2021 | ............. H01R 4/483 |

* cited by examiner

CONNECTION ASSEMBLY, CONNECTION CLAMP AND ELECTRONIC DEVICE

CROSS-REFERENCE TO PRIOR APPLICATIONS

This application is a U.S. National Phase application under 35 U.S.C. § 371 of International Application No. PCT/EP2022/068032, filed on Jun. 30, 2022, and claims benefit to German Patent Application No. DE 10 2021 117 396.5, filed on Jul. 6, 2021. The International Application was published in German on Jan. 12, 2023 as WO/2023/280670 under PCT Article 21(2).

FIELD

The invention relates to a connection assembly for connecting an electrical conductor. The invention further relates to a connection clamp and an electronic device.

BACKGROUND

Such connection assemblies usually have a clamping spring designed as a leg spring, which clamping spring has a holding leg and a clamping leg, wherein a conductor inserted into the connection assembly can be clamped against the current bar by means of the clamping leg of the clamping spring. If, in particular, flexible conductors are clamped, the clamping spring must already be moved, before insertion of the conductor, into an open position by means of an actuating element and thus be actuated in order to pivot the clamping spring or the clamping leg away from the current bar so that the conductor can be inserted into the intermediate space designed as a conductor connection space between the current bar and the clamping spring. Only in the case of rigid and thus robust conductors can the conductor apply sufficient force to the clamping spring or the clamping leg of the clamping spring to be able to pivot the clamping leg away from the current bar without the actuating element having to be actuated for this purpose by a user. With flexible conductors, the user must first pivot the clamping spring away from the current bar by actuating the actuating element so that the flexible conductor can be inserted. Here, the actuating element usually presses against the clamping leg of the clamping spring in order to pivot the clamping leg away from the current bar and free the conductor connection space. The actuating element is then usually held manually in this open position until the flexible conductor is inserted into the connection space and can be clamped against the current bar.

SUMMARY

In an embodiment, the present invention provides a connection assembly for connecting an electrical conductor, comprising: a current bar; a clamping spring having a holding leg and a clamping leg, the conductor to be connected being clampable against a clamping section of the current bar by the clamping leg, with the clamping spring in a clamping position; an actuating element linearly guidable along an actuation direction and by which the clamping spring is transferrable from the clamping position into an open position, the actuating element being braced, in the open position, with the clamping spring and holding the clamping spring in the open position; and a rotatably-mounted lever element configured to act upon the actuating element to actuate the actuating element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
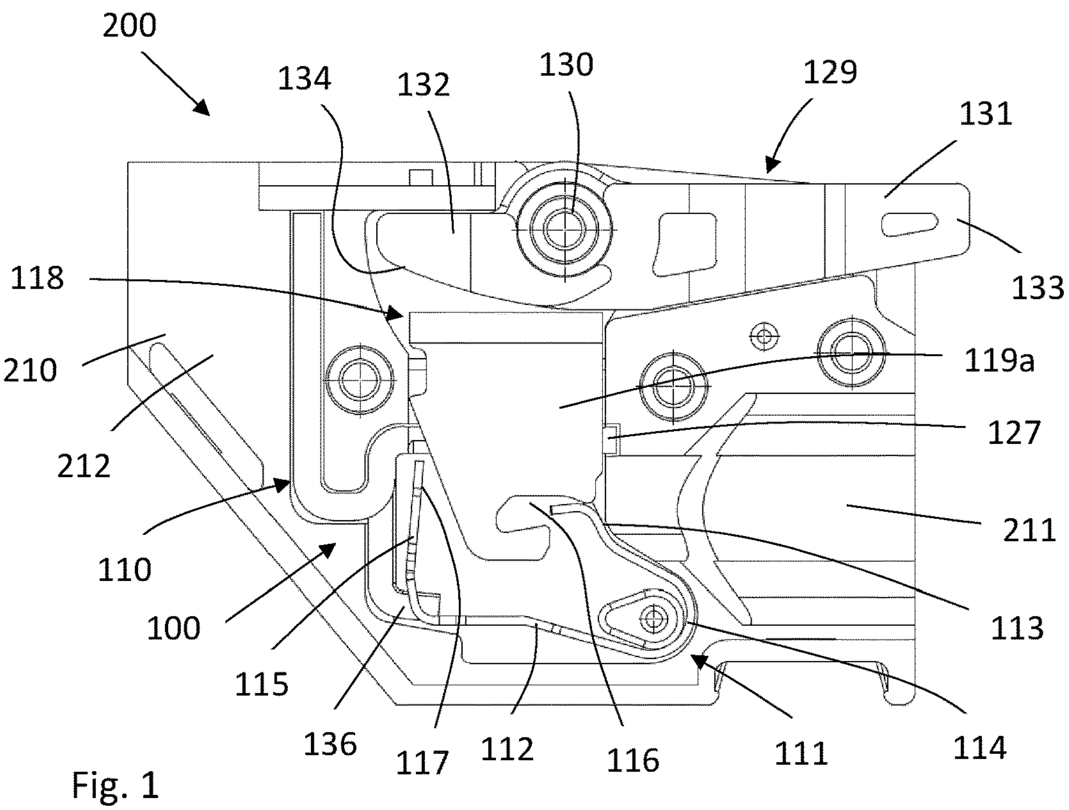
FIG. 1 shows a schematic representation of a connection clamp according to the invention, with the clamping spring in a clamping position.

In an embodiment, the present invention provides a connection assembly as well as a connection clamp and an electronic device, with which handling while conductors, and in particular flexible conductors, are being connected can be simplified for a user.

The connection assembly according to the invention has a current bar and a clamping spring. The clamping spring has a holding leg and a clamping leg, the conductor to be connected being clamped against a clamping section of the current bar by means of the clamping leg, with the clamping spring in a clamping position. The connection assembly also has an actuating element, which can be linearly guided along an actuation direction and by means of which the clamping spring can be transferred from the clamping position into the open position; in the open position, the actuating element is braced with the clamping spring and holds the clamping spring in the open position. Furthermore, the connection assembly has a rotatably-mounted lever element, which acts upon the actuating element in order to actuate the actuating element.

Due to the braced arrangement of the actuating element with the clamping spring in the open position of the clamping spring, the actuating element can be held automatically in this position in order to hold the clamping spring in the open position. The actuating element and the clamping spring support one another in the open position. The actuating element and the clamping spring can thus form a self-contained force system in the open position of the clamping spring so that, in the open position of the clamping spring, the actuating element can be held in a fixed position relative to the clamping spring by the force of the clamping spring, without the actuating element having to be held manually or by means of a tool in this position. This enables simpler and in particular one-handed operation of the connection assembly by a user in order to be able to connect a conductor, and in particular a flexible conductor, simply and securely. As a result of the braced arrangement when the clamping spring is in the open position, the clamping spring and the actuating element hold one another in the desired position and prevent movement relative to one another.

The actuating element for actuating the clamping spring interacts with the clamping leg of the clamping spring. The actuating element performs a linear movement in order to actuate the clamping spring. The actuating element forms a type of slide element which interacts directly with the clamping spring. In particular in order to transfer the clamping spring from an initial position or a clamping position into the open position, this actuating element is actuated by means of the lever element, by virtue of the fact that a rotational movement of the lever element causes a linear movement of the actuating element, in order to actuate the clamping spring. The lever element thus acts upon the clamping spring not directly, but, rather, indirectly by means of the actuating element. The lever element is in the form of a rotary lever. The lever element can have a handle section on a first end section, by means of which handle section a user can grip the lever element in order to actuate and thus rotate the lever element. An actuating surface can be formed on a second end section of the lever element opposite the first end section, by means of which actuating surface, during actuation of the actuating element, the lever element can contact the actuating element and can roll on the actuating element in a rotational movement. The pivot point or the axis of rotation of the lever element is preferably formed between the first end section and the second end section of the lever element. The lever element interacts with the actuating element in such a way that, for actuation of the actuating element, the lever element can apply a pressure force to the actuating element in order to move the actuating element linearly in the actuation direction and to thereby brace the actuating element with the clamping spring.

In order to form the bracing, the clamping spring, in the open position, can apply a first pressure force acting counter to the actuation direction of the actuating element and a second pressure force acting in the actuation direction of the actuating element to the actuating element. By means of these two, oppositely-acting pressure forces applied by the clamping spring, the actuating element can be held in the open position solely by the force of the clamping spring. Both the first pressure force and the second pressure force are applied by the clamping spring to the actuating element so that in the open position, the actuating element can be clamped between the clamping spring or sub-portions of the clamping spring and held in a stationary manner by these two, oppositely-acting pressure forces.

According to the invention, the clamping spring can be designed in such a way that a latching leg can be arranged on the holding leg and can apply, in the open position, the second pressure force to the actuating element. The second pressure force is then preferably precisely not applied to the actuating element by the clamping leg or the holding leg of the clamping spring, but the clamping spring can have a third leg—the latching leg—by means of which the second pressure force can be applied to the actuating element. The latching leg can be arranged on the holding leg at an end of the holding leg remote from the clamping leg. The holding leg can thus be arranged between the clamping leg and the latching leg. The latching leg can be formed integrally with the holding leg or be connected as a separate part to the latching leg, and in particular connected to the latching leg in a form-fitting and/or force-fitting manner.

The latching leg is preferably connected resiliently to the holding leg or is formed with the holding leg so that the latching leg can be pivotable relative to the holding leg.

In order to enable, in particular, a tool-free connection of conductors with a small conductor cross-section—in particular, of flexible conductors—the latching leg can have a pressure surface, wherein, for transferring the clamping spring from the open position into the clamped position, the pressure surface can be actuated by the conductor to be connected and can be brought out of engagement with the actuating element by actuating the pressure surface of the latching legs. The latching leg can have a pressure surface which can be arranged flush with an insertion region of the conductor into the connection assembly and thus in extension of a conductor insertion opening of a housing of a connection terminal so that the conductor abuts against the pressure surface of the latching element during insertion into the connection assembly. By applying a pressure force to the pressure surface by means of the conductor, the latching leg can be put into a pivoting movement or tilting movement in the direction of the conductor insertion direction so that the latching leg can be pivoted or tilted away from the actuating element in the conductor insertion direction. As a result of the pivoting movement of the latching leg, the latching leg can be brought out of engagement with the actuating element and can thus be released from the actuating element so that the actuating element and thus the clamping spring can be transferred from the open position into the clamped position without manual assistance. By means of this special mechanism, a conductor, and in particular a conductor with a small conductor cross-section and/or a flexible conductor, can be connected in a particularly simple manner solely by the insertion movement of the conductor, without a user having to actuate further elements, such as the actuating element, on the connection assembly in order to release the clamping spring and to transfer the clamping spring from the open position into the clamping position. This facilitates the handling of the connection assembly and saves time when connecting a conductor. The bracing of the actuating element with the clamping spring in the open position of the clamping spring can thus be released or canceled by the conductor to be connected.

In order to hold the latching leg on the actuating element in the open position of the clamping spring, the actuating element can have a holding contour. The holding contour enables a secure and defined holding of the latching leg on the actuating element in the open position of the clamping spring. In the region of the holding contour, the latching leg can apply, in the open position of the clamping spring, the second pressure force on the actuating element. The holding contour is preferably designed in the form of a special surface shaping on the actuating element itself. The holding contour can be shaped in such a way that it can form a reach-behind formation or undercut for the latching leg, behind which the latching leg can latch when the clamping spring is in the open position.

The actuating element can have at least one actuating arm extending in the actuation direction, in which case the holding contour can be formed on the at least one actuating arm. The actuating element preferably can have a first actuating arm extending in the actuation direction and a second actuating arm spaced apart from the first actuating arm and extending in the actuation direction, in which case the holding contour can then be formed on the first actuating arm and on the second actuating arm. The actuating element can then have a U-shaped cross-section. The two actuating arms are preferably oriented parallel to one another. Between the two actuating arms, a free space is formed into which the conductor to be connected is inserted and through which the conductor to be connected can be guided in the direction of the latching leg. The clamping section of the current bar preferably projects into the free space formed between the two actuating arms, so that the clamping of the conductor against the clamping section of the current bar can occur within the free space. The conductor connection space formed between the current bar and the clamping spring can be laterally delimited by the at least one actuating arm, and preferably by the first actuating arm and the second actuating arm, so that the at least one actuating arm or the two actuating arms can guide the conductor to be connected and prevent the conductor from deflecting laterally. The holding contour on the first actuating arm is preferably formed symmetrically to the holding contour arranged on the second actuating arm. In the open position of the clamping spring, the latching leg can be held, and in particular latched, on the two actuating arms or on the two holding contours of the two actuating arms. At its free end, the latching leg can have a T-shaped form, with which the latching leg can be held on the two actuating arms. As a result of the T-shape, the latching leg can have a first laterally-projecting holding arm and a second laterally-projecting holding arm, wherein the first holding arm can hold the latching leg on the holding contour of the first actuating arm, and the second holding arm can hold the latching leg on the holding contour of the second actuating arm.

In the open position, the first pressure force can be applied to the actuating element by means of the clamping leg of the clamping spring, wherein the clamping leg can have a clamping tab and at least one side tab arranged laterally of the clamping tab, wherein a clamping edge for clamping the conductor to be connected against the current bar in the clamped position can be formed on a free end of the clamping tab, and the first pressure force can be applied to the actuating element by means of the at least one side tab in the open position. The clamping leg itself can thus apply the first pressure force, which can act counter to the actuation direction of the actuating element, to the actuating element. If the latching leg is released from the bracing or latching with the actuating element, only the first pressure force applied by the clamping leg still acts upon the actuating element, so that the clamping spring or the clamping leg can then automatically pivot from the open position into the clamped position as a result of this pressure force of the clamping leg in that the clamping leg can press the actuating element upwards counter to the actuation direction. The clamping leg is preferably divided into a clamping tab and at least one, and preferably two, side tabs which can be formed laterally of the clamping tab. In the case of two side tabs, the clamping tab is arranged between the two side tabs. The two side tabs are preferably in direct contact with the actuating element so that the first pressure force can be applied to the actuating element via these two side tabs. The clamping tab is preferably not in direct contact with the actuating element, but the clamping tab is used solely to clamp the conductor against the current bar in the clamped position. The at least one side tab is preferably curved so that it can form a runner which can slide along an edge surface of the actuating element during the transfer into the open position and into the clamped position.

The connection assembly is preferably designed in such a way that the actuation direction of the actuating element can be formed transversely to a conductor insertion direction of the conductor to be connected into a conductor connection space formed between the current bar and the clamping spring.

The lever element can have an axis of rotation, by means of which the lever element can be rotatably mounted. The axis of rotation is preferably arranged off-center with respect to the length of the lever element. The axis of rotation is particularly preferably arranged closer to the second end section, on which the actuating surface is formed, than to the first end section, on which the handle section is formed. This enables particularly good transmission of the spring force of the clamping spring from the lever element to the actuating element. Thus, the user can actuate the connection assembly particularly easily and without great application of force.

The actuating element can have a connecting web extending transversely to the actuation direction, in which case the lever element can roll on the connecting web during rotational movement of the lever element. The connecting web is preferably connected to the at least one actuating arm of the actuating element. If the actuating element has two actuating arms, the connecting web can extend between the two actuating arms, so that the connecting web can connect the two actuating arms to one another. The connecting web preferably extends parallel to the clamping section of the current bar. With respect to the actuation direction, the connecting web is arranged above the clamping section, so that the connecting web is arranged outside the conductor connection space. The actuation of the actuating element by means of the lever element thus occurs outside the conductor connection space. When the actuating element is actuated, the actuating surface of the lever element rolls on the connecting web, so that the lever element can travel along the connecting web during a rotational movement. The lever element can travel or roll along the connecting web in a direction transverse to the actuation direction of the actuating element.

A restoring spring which interacts with the lever element can be provided so that, after the clamping spring and thus actuating element have been transferred from a clamping position or initial position into the open position, the lever element can be rotated back in a controlled manner. In the clamping position or initial position, the restoring spring is preferably unloaded. If the lever element is rotated in order to move the actuating element in the actuation direction and to thereby move the clamping spring from the clamping position into the open position, the restoring spring is loaded. If the clamping spring is in the open position and the actuating element is braced with the clamping spring in order to hold the clamping spring in the open position, the restoring spring can cause the lever element to be rotated back in a controlled manner, without a user having to actuate the lever element. The operability for a user can thereby be improved, and in particular a risk of injury to a user can be reduced, since uncontrolled slamming back of the lever element can be prevented.

The restoring spring can preferably be in the form of a leg spring, which can have a first leg and a second leg connected to the first leg by an arcuate section, in which case the first leg of the leg spring can engage, in a form-fit, in a receiving contour formed on the lever element. The leg spring or restoring spring can, for example, be formed by a bent wire. However, the leg spring or restoring spring can also be punched out of a metal strip and bent. If the restoring spring engages, in a form-fit, in a receiving contour of the lever element, a defined position of the restoring spring relative to the lever element can be ensured. In particular, lateral slipping of the restoring spring relative to the lever element can be prevented. Within the receiving contour, the lever element can roll on the first leg of the restoring spring in order to load or relax the restoring spring. The lever element can thus be moved, and in particular rotated, relative to the restoring spring. The receiving contour can in particular be formed, in parts, in the region of the actuating surface. Since the restoring spring can dip into the receiving contour, the restoring spring does not hinder the rolling movement of the lever element on the actuating element. The second leg preferably serves as a holding leg, so that the second leg is preferably fixedly arranged. In contrast, the first leg is preferably movable relative to the second leg in order to be able to interact with the lever element. The lever element preferably has direct contact only with the second leg. In contrast, the lever element is preferably spaced apart from the first leg. The receiving contour is preferably in the form of an elongated slot or in the form of an elongated groove in the lever element.

In order to be able to achieve positionally-secure support of the clamping spring, the current bar can have a holding section formed at a distance from the clamping section, in which case the clamping spring can be held on the holding section. When held on the current bar, the clamping spring can be supported against the metal of the current bar, and this can result in high stability of the position of the clamping spring. By holding the clamping spring on the current bar, unintentional tilting of the clamping spring relative to the current bar can be prevented. The holding section preferably extends substantially parallel to the clamping section. The clamping spring can be suspended on the holding section of the current bar.

For holding the clamping spring on the holding section of the current bar, the clamping spring can have, for example, an opening into which the holding section of the current bar can be inserted. For example, the holding section of the current bar can hook into the opening in order to suspend the clamping spring on the holding section. The opening in the clamping spring can be formed, for example, in the transition of the latching leg to the holding leg.

In order to also be able to prevent tilting of the actuating element relative to the current bar and thus also relative to the clamping spring, the current bar can have a guide section extending in the actuation direction, on which guide section the actuating element can be guided. The guide section preferably extends transversely to the clamping section and to the holding section of the current bar. With respect to the actuation direction, the guide section is preferably arranged above the clamping section. The guidance of the actuating element on the guide section of the current bar can thus be provided and formed outside the conductor connection space. The guidance can be formed by means of a form-fitting connection of the guide section to the actuating element. The actuating element can preferably interact with the guide section by means of the connecting web of the actuating element so that the actuating element is guided along the guide section. The connecting web can engage with the guide section in a form-fit.

The guide section can be designed such that it has a first guide bar and a second guide bar extending parallel to the first guide bar, in which case the actuating element can be guided between the first guide bar and the second guide bar. The two guide bars can form a guide for the actuating element that provides delimitation on two sides. The connecting web of the actuating element can preferably be arranged and guided in a free space formed between the two guide bars.

The object according to the invention is also achieved by means of a connection clamp, and in particular a terminal block, which has a housing and at least one connection assembly arranged in the housing and formed and developed as described above. A conductor insertion opening can be formed in the housing, the conductor insertion opening being aligned with the conductor connection space of the connection assembly, and the conductor to be connected being able to be inserted through the conductor insertion opening into the housing and thus into the connection assembly. In particular in the case of a design as a terminal block which can be latched onto a support rail, two such connection assemblies can also be arranged in the housing.

The lever element can be rotatably mounted, e.g., on the housing, by means of the axis of rotation of the lever element. The lever element can thus be suspended on the housing.

In order to facilitate the assembly of the connection clamp, the housing can be of a two-part design. A first housing part can serve as a receiving part for the connection assembly. If the connection assembly has been mounted in the first housing part designed as a receiving part, a second housing part, which can form a housing cover, can be mounted on and fastened to the first housing part.

Furthermore, the object according to the invention can be achieved by means of an electronic device which has at least one connection assembly formed and developed as described above and/or at least one connection terminal formed and developed as described above. The electronic device can, for example, be a switch cabinet, in which one or more support rails or mounting plates can be arranged, on which several connection clamps, and in particular terminal blocks, which can have corresponding connection assemblies, can be latched.

FIGS. 1 through 15 show a connection clamp 200 having a housing 210, within which a connection assembly 100 for connecting a conductor is arranged. The housing 210 is preferably formed from an insulating material—for example, a plastic material. The connection assembly 100 is arranged in an interior of the housing 210. A conductor to be connected can be inserted into the interior of the housing 210 through a conductor insertion opening 211 formed in the housing 210, in order to connect the conductor to the connection assembly 100.

Figure 8:
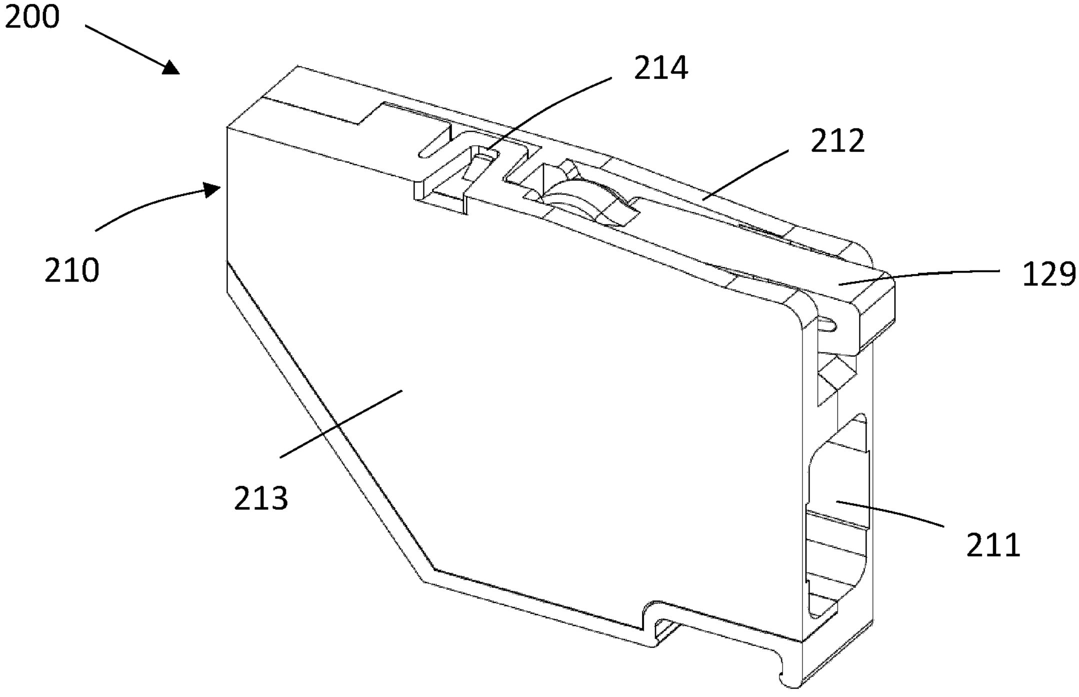
FIG. 8 shows a schematic representation of the connection clamp according to the invention with the housing closed and with the lever element closed.
Figure 9:
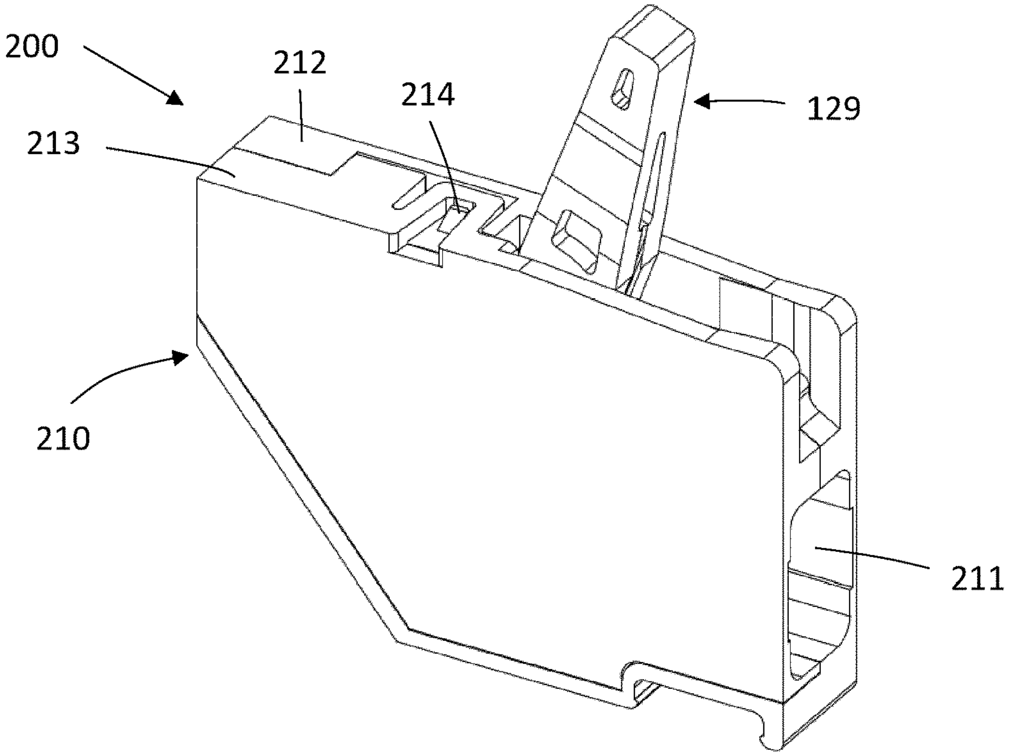
FIG. 9 shows a schematic representation of the connection clamp according to the invention with the housing closed and with the lever element open.

In the embodiments shown here, the housing 210 is formed from a first housing part 212 and a second housing part 213, as can be seen in particular in FIGS. 8 and 9, such that the housing 210 is of a two-part design. Here, the two housing parts 212, 213 are connected to one another, in the closed state, by means of a latching connection 214. The first housing part 212 forms a receiving part in which the connection assembly 100 is arranged and mounted, as can be seen in particular in FIGS. 1 through 6 and 10 through 12. The second housing part 213 forms a housing cover which, after the connection assembly 100 has been mounted on or in the first housing part 212, is placed onto the first housing part 212 and connected thereto in order to close the housing 210 and in particular the interior of the housing 210.

FIGS. 1 through 6 and 10 through 12 show the first housing part 212 with the connection assembly 100 received therein.

The connection assembly 100 has a current bar 110 and a clamping spring 111; by means of the clamping spring 111, the conductor to be connected can be electrically-conductively clamped against a clamping section 127 of the current bar 110 and thus connected.

The clamping spring 111 is designed as a leg spring. The clamping spring 111 has a holding leg 112 and a clamping leg 113. The holding leg 112 and the clamping leg 113 are connected to one another by an arcuate section 114. The holding leg 112 is arranged in a fixed position in the housing 210. The clamping leg 113 is pivotable relative to the holding leg 112 so that, according to the position of the clamping leg 113, the clamping spring 111 can be transferred into and positioned in an open position, as shown for example in FIGS. 2 and 3, and a clamping position, as shown for example in FIG. 1.

The clamping spring 111 also has a latching leg 115, so that the clamping spring 111 has three legs. The latching leg 115 is connected to the holding leg 112, so that the holding leg 112 is arranged between the clamping leg 113 and the latching leg 115. In the embodiment shown here, the latching leg 115 extends substantially at a right angle away from the holding leg 112. The latching leg 115 is designed long enough that it projects, starting from the holding leg 112, beyond the clamping leg 113, at least in the open position of the clamping spring 111. The latching leg 115 serves to help hold the clamping spring 111 in the open position.

The latching leg 115 extends, starting from the holding leg 112, towards the conductor connection space 116, which is formed between the clamping section 127 of the current bar 110 and the clamping spring 111; the conductor to be connected can be inserted into this conductor connection space 116 through the conductor insertion opening 211 of the housing 210, in order to connect the conductor and clamp it against the clamping section 127 of the current bar 110.

The latching leg 115 is designed long enough that it delimits the conductor connection space 116 in the conductor insertion direction E. If a conductor is inserted into the conductor connection space 116 through the conductor insertion opening 211 of the housing 210, the conductor abuts against the latching leg 115, as a result of which the latching leg 115 can be deflected or pivoted in the conductor insertion direction E. The latching leg 115 has a pressure surface 117 which faces the conductor connection space 116 and against which the conductor can abut during insertion into the conductor connection space 116. The latching leg 115 is resiliently connected to the holding leg 112, so that the latching leg 115 can be deflected.

The clamping spring 111 is supported on the current bar 110. For this purpose, the current bar 110 has a holding section 136 to which the clamping spring 111 can be fastened. The clamping spring 111 can have, for this purpose, an opening 137 into which the holding section 136 of the current bar 110 can reach when the clamping spring 111 is mounted on the current bar 110. The clamping spring 111 can thereby be suspended on the holding section 136 and thus on the current bar 110. The holding section 136 extends parallel to the clamping section 127 of the current bar 110. The holding section 136 is shorter in length than the clamping section 127. The opening 137 is formed at the transition between the holding leg 112 and the latching leg 115 of the clamping spring 111.

In order to transfer the clamping spring 111 from the clamped position into the open position, the connection assembly 100 furthermore has an actuating element 118. The actuating element 118 is guided purely linearly in the housing 210. The actuating element 118 forms a type of slide element. When the clamping spring 111 is actuated in order to transfer it from the clamping position into the open position, the actuating element 118 is moved in the actuation direction B, in which the actuating element 118 is moved towards the clamping spring 111. The actuating element 118 interacts with the clamping leg 113 of the clamping spring 111 in that the actuating element 118 exerts a force in the actuation direction B on the clamping leg 113 so that the latter is pivoted in the direction of the holding leg 112 in order to free the conductor connection space 116.

Figure 6:
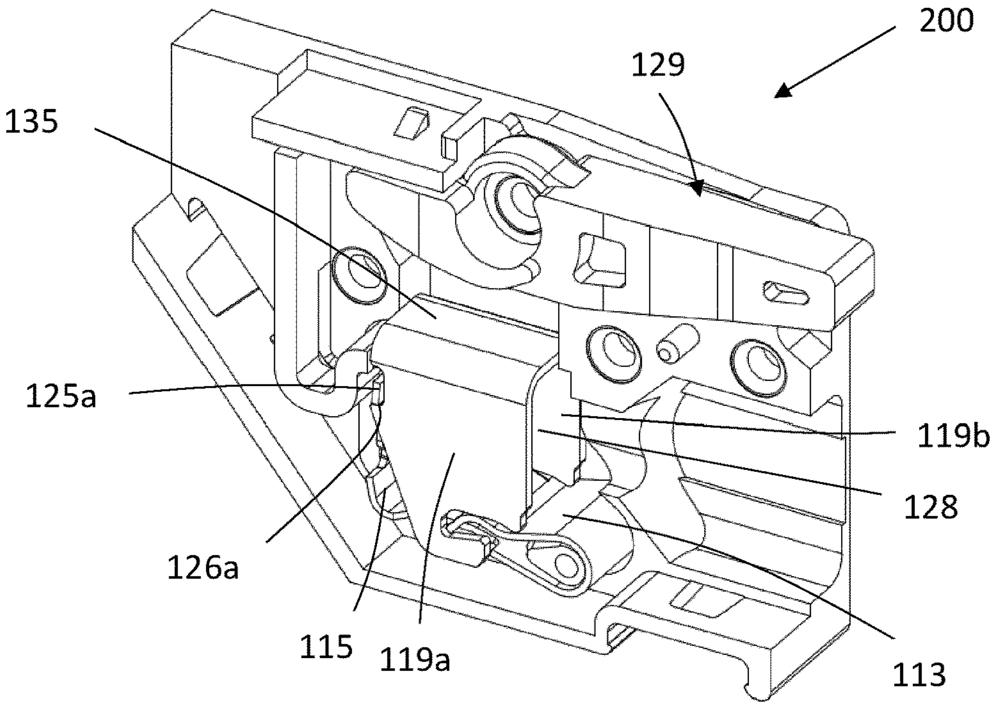
FIG. 6 shows a schematic perspectival representation of the connection clamp shown in FIG. 3.
Figure 7:
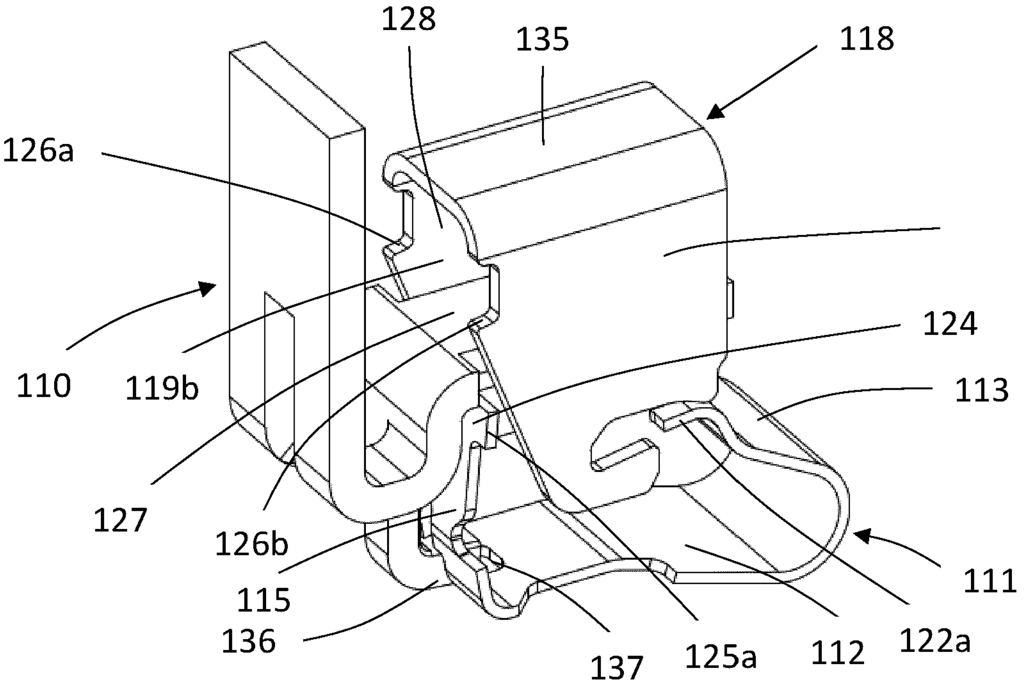
FIG. 7 shows a schematic representation of the current bar together with the clamping spring and the actuating element according to the embodiment of the connection clamp shown in FIGS. 1 through 6.

In the embodiment shown here, the actuating element 118 has a U-shaped cross-section, as can be seen in particular in FIG. 7. The actuating element 118 has two actuating arms 119*a*, 119*b* extending parallel to one another, as can be seen in particular in FIGS. 5 through 7. Between the two actuating arms 119*a*, 119*b*, a free space 128 is formed, through which the clamping section 127 of the current bar 110 and the conductor to be connected can be guided, so that the conductor connection space 116 is formed in the free space 128, and the conductor to be connected can be clamped, within the free space 128, against the clamping section 127 of the current bar 110. The two actuating arms 119*a*, 119*b* are designed to be long enough that they laterally delimit the conductor connection space 116 and thus can form a lateral guide for the conductor to be connected.

On the edge surfaces, facing the clamping spring 111, of the actuating arms 119*a*, 119*b*, respective actuating surfaces 120*a*, 120*b* are formed, which interact with the clamping spring 111 in order to actuate the clamping spring 111. With its two actuating surfaces 120*a*, 120*b*, the actuating element 118 rests on the clamping leg 113 of the clamping spring 111 when said clamping leg is transferred from the clamped position into the open position.

Figure 15:
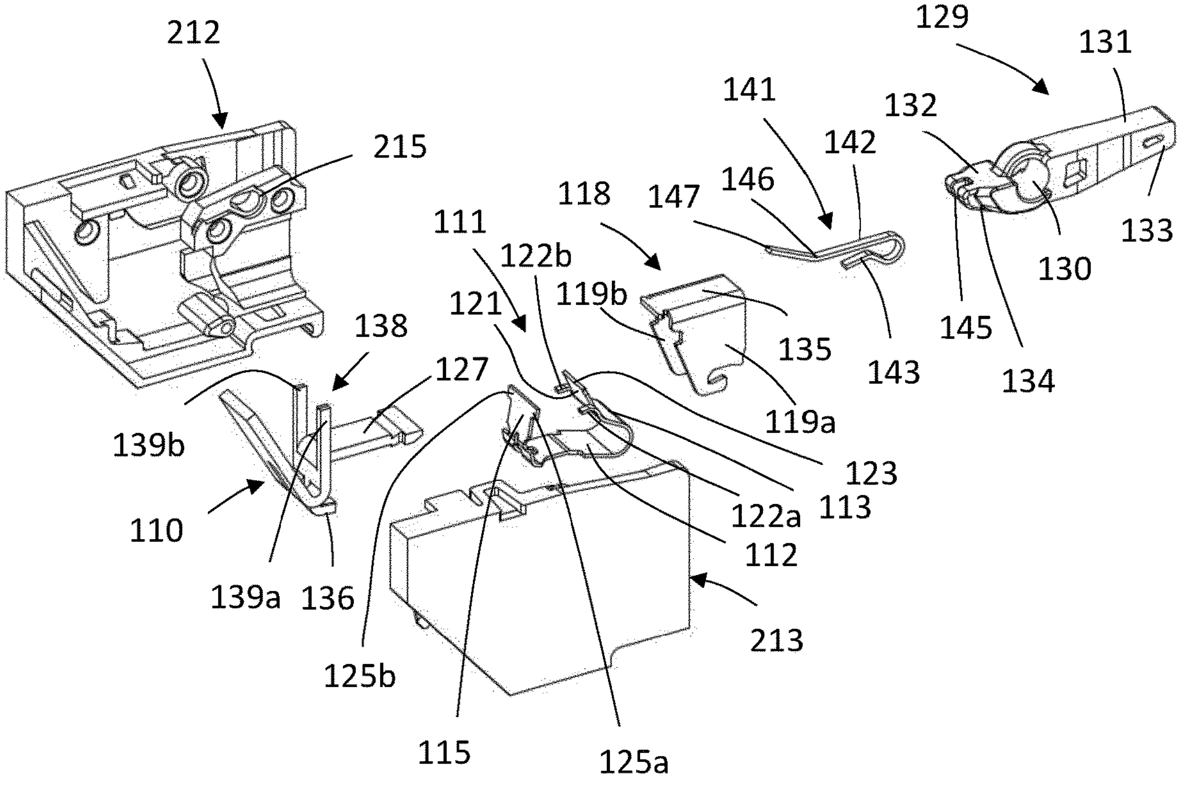
FIG. 15 shows an exploded view of the connection clamp shown in FIGS. 10 through 14.

As can be seen in particular in the exploded view of FIG. 15, the clamping leg 113 has a clamping tab 121 and two side tabs 122*a*, 122*b* arranged laterally to the clamping tab 121. The clamping tab 121 has, at its free end, a clamping edge 123, by means of which the conductor to be connected is clamped against the clamping section 127 of the current bar 110.

The clamping tab 121 is arranged between the two side tabs 122*a*, 122*b*. The clamping tab 121 is longer than the two side tabs 122*a*, 122*b*, so that the clamping tab 121 extends beyond the two side tabs 122*a*, 122*b*. The two side tabs 122*a*, 122*b* each have an arcuate shape. The two side tabs 122*a*, 122*b* can thus each form a runner which can slide along the actuating surfaces 120*a*, 120*b* when interacting with the actuating element 118. For actuating the clamping spring 111, the actuating element 118 is thus in direct contact with the two side tabs 122*a*, 122*b* of the clamping spring 111, whereas the clamping tab 121 does not have direct contact with the actuating element 118. The clamping tab 121 is arranged in the free space 128 formed between the two actuating arms 119*a*, 119*b*.

In particular, FIGS. 2, 3, 5, and 6 show the clamping spring 111 in the open position, in which the conductor connection space 116 is freed so that a conductor to be connected can be inserted into the conductor connection space and also guided out of it again. In this open position, the clamping spring 111 and the actuating element 118 are braced with one another so that the clamping spring 111 and the actuating element 118 can form a closed force system, in which the actuating element 118 is held in position by the clamping spring 111 without additional auxiliary means, and the clamping spring 111 is in turn held in position by the actuating element 118.

The actuating element 118 is braced with the clamping spring 111 in that, in the open position, the clamping spring 111 applies two, oppositely-acting pressure forces D1, D2 to the actuating element 118. As a result of these two, oppositely-acting pressure forces D1, D2, the actuating element 118 and thus also the clamping spring 111 can be held in a stable, stationary position.

The first pressure force D1 acts upon the actuating element 118 counter to the actuation direction B. The first pressure force D1 is applied to the actuating element 118 by the clamping leg 113, and in particular by the side tabs 122*a*, 122*b* of the clamping leg 113. In the process, the side tabs 122*a*, 122*b* press on the actuating surfaces 120*a*, 120*b* of the actuating element 118 with the first pressure force D1 applied by the spring effect of the clamping leg 113.

The second pressure force D2 acts upon the actuating element 118 in the actuation direction B. The second pressure force D2 is applied by the latching leg 115 of the clamping spring 111 to the actuating element 118. The latching leg 115 is held with its free end 124 on the actuating element 118—in particular, on the two actuating arms 119*a*, 119*b* of the actuating element 118, and in particular latched on the actuating element 118. As can be seen in the exploded view of FIG. 15, the free end 124 has a T-shape, since the free end 124 has two holding arms 125*a*, 125*b* projecting laterally outwards. In the open position, the latching leg 115 is held with its first holding arm 125*a* on the first actuating arm 119*a* and held with its second holding arm 125*b* on the second actuating arm 119*b*.

In order to be able to ensure a positionally-secure and thus defined holding of the latching leg 115 on the actuating element 118 in the open position, a holding contour 126*a*, 126*b* is formed on each of the two actuating arms 119*a*, 119*b*. The holding contour 126*a*, 126*b* is formed at a distance from the actuating surfaces 120*a*, 120*b* on the actuating element 118. In the open position, the two holding arms 125*a*, 125*b* of the latching leg 115 rest against the holding contour 126*a*, 126*b* of the actuating arms 119*a*, 119*b* in order to hold the latching leg 115 in a stationary position.

The connection assembly 100 also has a rotatably-mounted lever element 129. The lever element 129 has an axis of rotation 130, by means of which the lever element 129 is rotatably mounted on the housing 210.

The lever element 129 has an elongated form with a first end section 131 and an opposite, second end section 132. A handle section 133, by means of which a user can grip and rotate the lever element 129, is formed on the first end section 131. An actuating surface 134 is formed on the second end section 132, by means of which actuating surface the lever element 129 can interact with the actuating element 118 in order to actuate the actuating element 118. During rotational movement of the lever element 129, the actuating surface 134 of the lever element 129 can, for this purpose, roll on a connecting web 135 of the actuating element 118, said connecting web running transversely to the actuation direction B. The connecting web 135 extends transversely to the two actuating arms 119*a*, 119*b* of the actuating element 118 and connects the two actuating arms 119*a*, 119*b* to one another.

Figure 4:
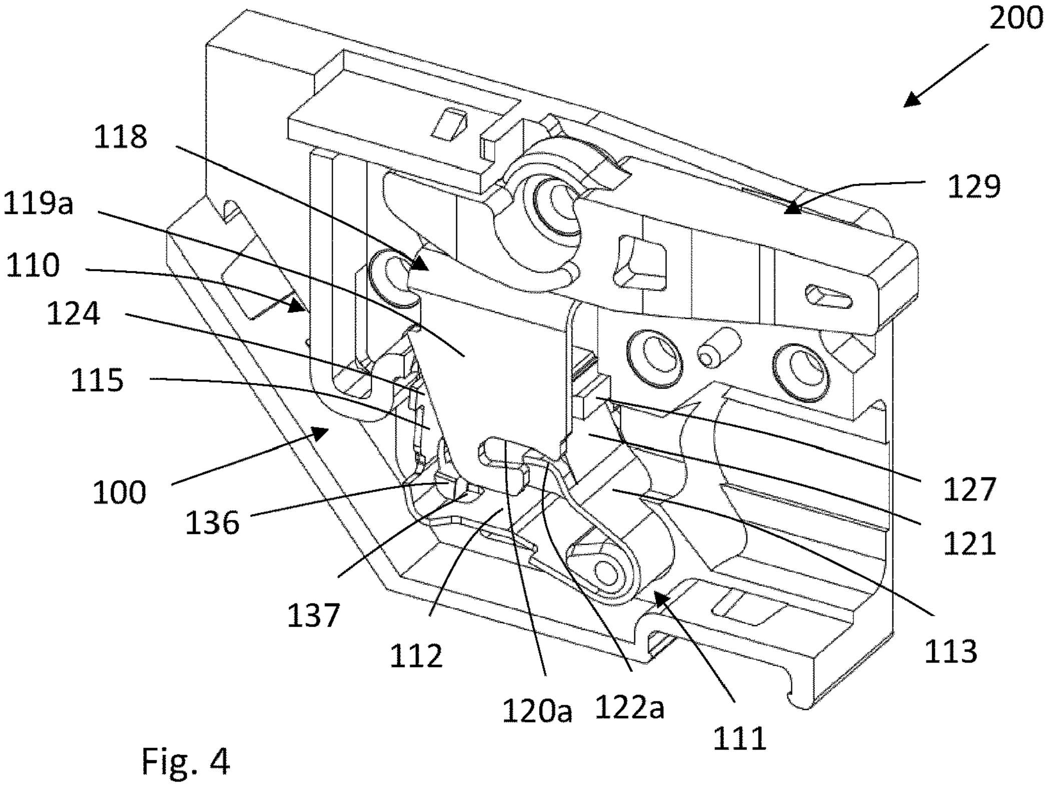
FIG. 4 shows a schematic perspectival representation of the connection clamp shown in FIG. 1.

FIGS. 1 and 4 show the connection clamp 200 with the lever element 129 in a closed position. The clamping spring 111 is in a clamping position, in which the actuating element 118 is currently not braced with the clamping spring 111.

Figure 2:
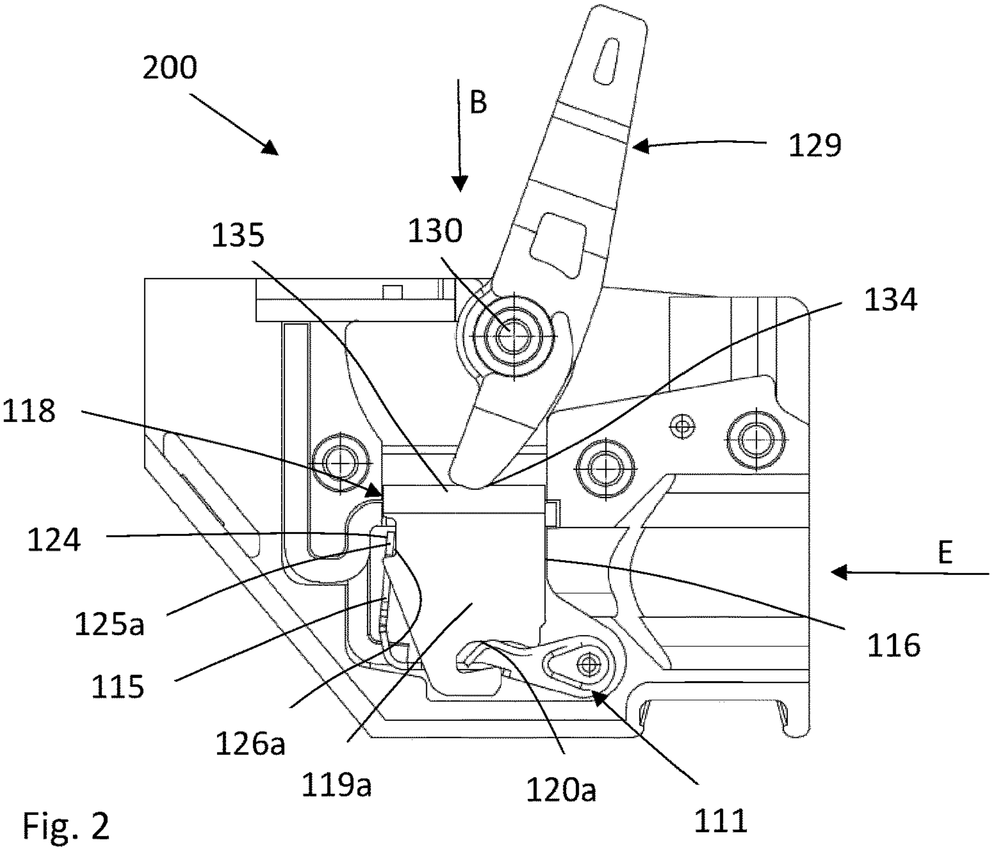
FIG. 2 shows a schematic representation of the connection clamp shown in FIG. 1, with the clamping spring in the open position.
Figure 5:
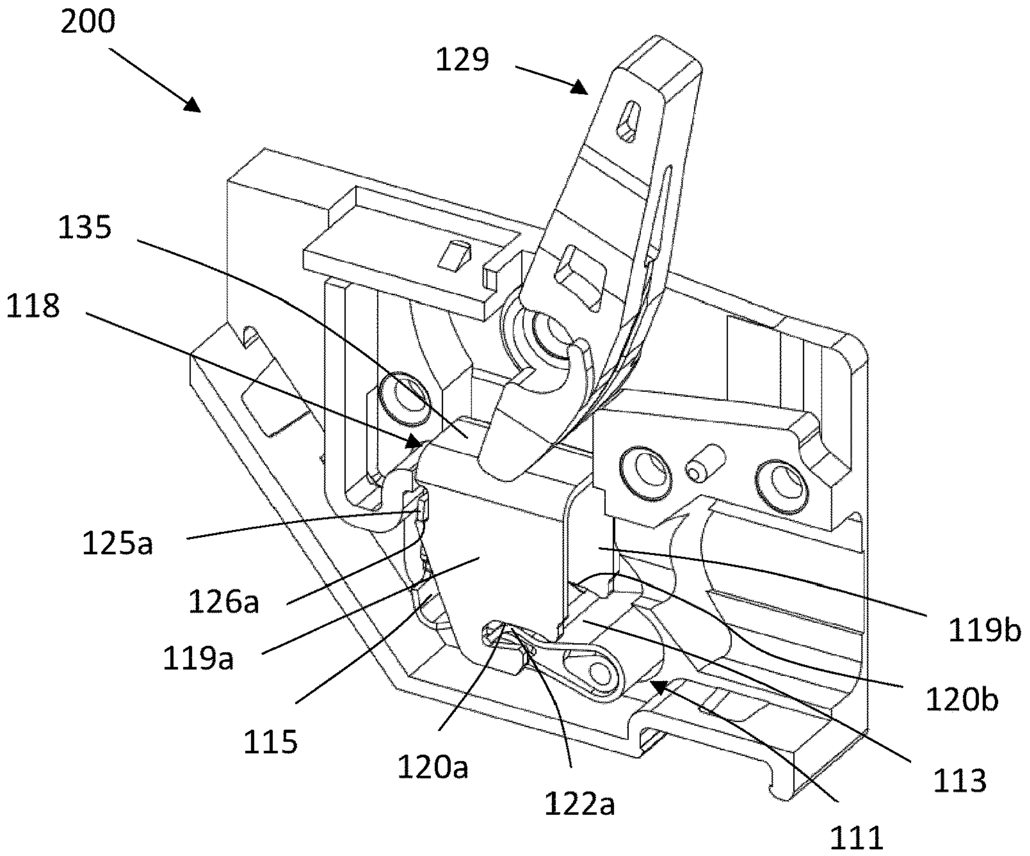
FIG. 5 shows a schematic perspectival representation of the connection clamp shown in FIG. 2.

In order to transfer the clamping spring 111 from this clamping position into the open position, which is shown in FIGS. 2, 3, 5, and 6, the lever element 129 is rotated about its axis of rotation 130 and is thereby rotated or pivoted into an open position, as shown in FIGS. 2 and 5. During the rotational movement, the actuating surface 134 of the lever element 129 hits the actuating element 118 and rolls, with its actuating surface 134, on the connecting web 135 of the actuating element 118. As a result of this rotational movement of the lever element 129, the actuating element 118 is moved linearly along the actuation direction B. The actuating element 118 is moved far enough in the actuation direction B, and thus towards the clamping spring 111, until the holding arms 125*a*, 125*b* of the latching leg 115 of the clamping spring 111 engage with or latch behind the holding contour 126*a*, 126 of the actuating element 118, as shown in FIG. 2.

The holding contour 126*a*, 126*b* is designed here as a recess or notch formed on each of the two actuating arms 119*a*, 119*b*, so that the holding contour 126*a*, 126*b* forms, for each of the holding arms 125*a*, 125*b* of the latching leg 115, an undercut behind which the holding arm in question can latch.

At the same time, for transferring the clamping spring 111 into the open position, the clamping leg 113 of the clamping spring 111 is pivoted towards the holding leg 112 by means of the actuating surfaces 120*a*, 120*b* in order to free the conductor connection space 116 between the clamping section 127 of the current bar 110 and the clamping leg 113.

Figure 3:
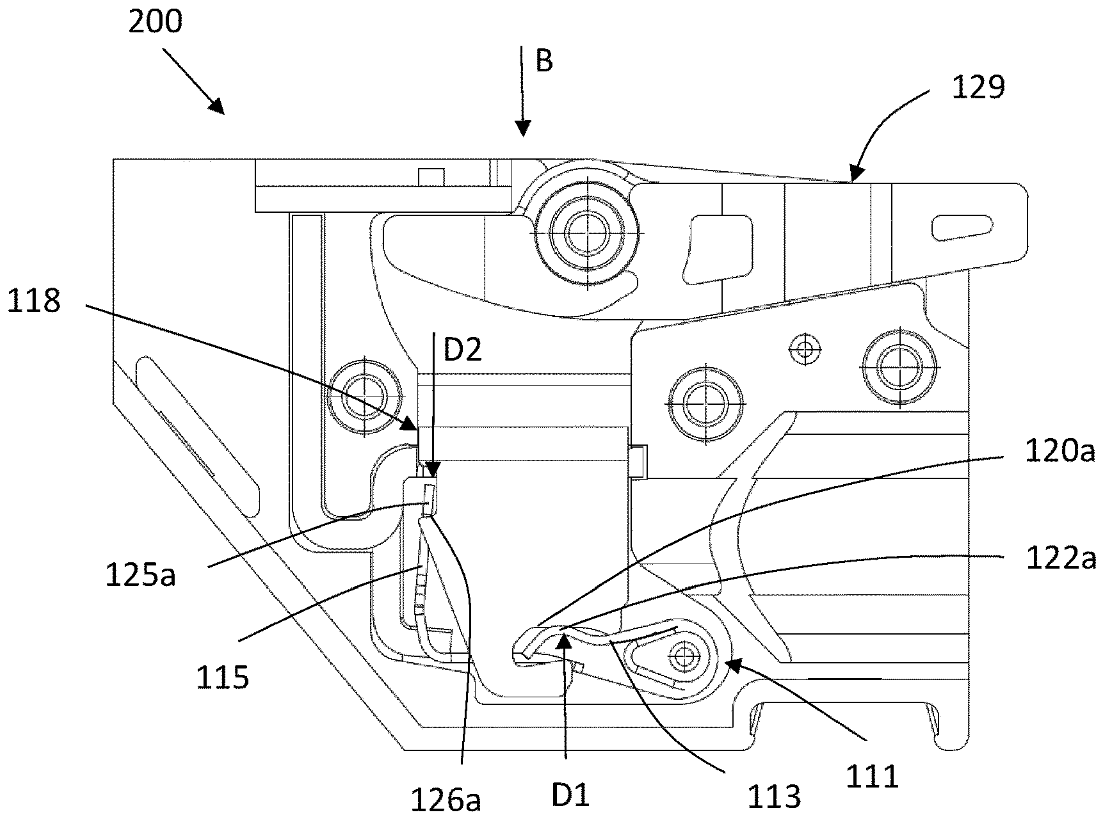
FIG. 3 shows a schematic representation of the connection clamp shown in FIG. 2, with the clamping spring in the open position and with the lever element rotated back.

FIGS. 2, 3, 5, and 6 show the actuating element 118 and the clamping spring 111 in the braced arrangement for holding the clamping spring 111 in the open position. If the clamping spring 111 is transferred into the open position, and the actuating element 118 and the clamping spring 111 are braced with one another, the lever element 129 can be rotated back from the open position, which is shown in FIGS. 2 and 5, into the closed position, as shown in FIGS. 3 and 6. The clamping spring 111 remains in the open position because of the braced arrangement with the actuating element 118.

The conductor to be connected can now be inserted through the conductor insertion opening 211 into the conductor connection space 116 in the conductor insertion direction E and connected.

If, when the clamping spring 111 is in the open position, a conductor to be connected is inserted through the conductor insertion opening 211 of the housing 210 into the conductor connection space 116 in the conductor insertion direction E, the conductor abuts against the pressure surface 117 of the latching leg 115 of the clamping spring 111, which pressure surface is aligned with the conductor insertion opening 211. By the abutment of the conductor against the pressure surface 117, the latching leg 115 is pivoted in the conductor insertion direction E so that the latching leg 115 is disengaged from the holding contour 126*a*, 126*b* of the actuating element 118.

As soon as the latching leg 115 is released from the actuating element 118, the bracing of the clamping spring 111 with the actuating element 118 is released, since the latching leg 115 no longer exerts a second pressure force D2 on the actuating element 118. Thus, only the first pressure force D1 applied by the clamping leg 113 to the actuating element 118 still acts upon the actuating element 118, as a result of which the clamping leg 113 can move the actuating element 118 upwards counter to the actuation direction B by the spring force of the clamping leg 113, as a result of which the clamping leg 113 also moves towards the conductor inserted into the conductor connection space 116 in order to press said conductor against the current bar 110 by means of the clamping tab 121 of the clamping leg 113, and thus to clamp the conductor against the current bar 110 and to connect the conductor.

This makes it possible to connect and clamp a conductor—in particular, a conductor with a small conductor cross-section—without additional assistance.

Here, the conductor is inserted into the conductor connection space 116 and thus into the connection assembly 100 or into the connection clamp 200 transversely to the actuation direction B of the actuating element 118.

FIGS. 8 and 9 show the connection clamp 200 with the housing 210 closed, i.e., with the two housing parts 212, 213 connected to one another, wherein, when the housing 210 is closed, the lever element 129 is easily accessible to a user for actuation of the lever element. FIG. 8 shows the lever element 129 in the closed position, whereas FIG. 9 shows the lever element 129 in the open position.

FIGS. 10 through 15 show another embodiment of a connection clamp 200, wherein the connection assembly 100 of the embodiment shown in FIGS. 10 through 15 differs from the embodiment shown in FIGS. 1 through 9 only in that the current bar 110 has a guide section 138 in addition to the clamping section 127 and the holding section 136, and in that the connection assembly 100 also has a restoring spring 141. Otherwise, the embodiment of a connection assembly 100 or connection clamp 200 shown in FIGS. 10 through 15 corresponds to the embodiment of a connection assembly 100 or connection clamp 200 shown in FIGS. 1 through 9.

The guide section 138 of the current bar 110 interacts with the actuating element 118 in order to guide the actuating element 118 during movement in and against the actuation direction B. For this purpose, the guide section 138 extends in the actuation direction B. The guide section 138 thus extends transversely to the clamping section 127 and the holding section 126. Viewed from the actuation direction B, the guide section 138 is arranged above the clamping section 127. The guidance of the actuating element 118 on the guide section 138 of the current bar 110 is thus provided and formed outside the conductor connection space 116.

As can be seen in particular in FIGS. 12 through 15, the guide section 138 has a first guide bar 139*a* and a second guide bar 139*b*. The two guide bars 139*a*, 139*b* extend parallel to one another. The actuating element 118 is guided, at least in parts, between the two guide bars 139*a*, 139*b*. The guidance can be formed by means of a form-fitting connection of the guide section 138 to the actuating element 118. Here, the actuating element 118 interacts with the guide section 138 by means of the connecting web 135 of the actuating element so that the actuating element 118 is guided along the guide section 138. The connecting web 135 engages with the guide section 138 in a form-fit in that, in the region of the guide section 138, the connecting web 135 is arranged and guided between the two guide bars 139*a*, 139*b*, so that lateral deflection or tilting of the actuating element 118 can be prevented. At the same time, the guide bars 139*a*, 139*b* can each form a guide surface 140*a*, 140*b* on which the two actuating arms 119*a*, 119*b* of the actuating element 118 can lie and be guided, as can be seen for example in FIG. 13. Above the holding contour 126*a*, 126*b*, the actuating element 118 can be guided, by means of its actuating arms 119*a*, 119*b*, on the guide surface 140*a*, 140*b*.

Furthermore, the embodiment shown in FIGS. 10 through 15 has a restoring spring 141, which interacts with the lever element 129. When the lever element 129 moves from the closed position into the open position of the lever element 129, the restoring spring 141 can be loaded by means of the lever element 129. Due to the loaded state of the restoring spring 141 when the lever element 129 is in the open position, the lever element 129 is led from the open position back into the closed position in a controlled manner as a result of the spring load of the restoring spring 141.

The restoring spring 141 is in the form of a leg spring. The restoring spring 141 has a first leg 142 and a second leg 143, which is connected to the first leg 142 by an arcuate section 144. As can be seen for example in FIGS. 12 and 15, the first leg 142 of the restoring spring 141 engages, in a form-fit, in a receiving contour 145 formed on the lever element 129, so that the first leg 142 of the restoring spring 141 is guided and held in the receiving contour 145. The receiving contour 145 is in the form of an elongated slot or an elongated groove, within which the first leg 142 of the restoring spring 141 lies. The receiving contour 145 extends in the longitudinal direction of the lever element 129. The receiving contour 145 extends, at least in parts, along the actuating surface 134 of the lever element 129.

Within the receiving contour 145, the lever element 129 can roll on the first leg 142 of the restoring spring 141 in order to load or relax the restoring spring 141. The lever element 129 can thus be moved, and in particular rotated, relative to the restoring spring 141.

As can be seen in FIG. 15, the first leg 142 has a bend 146 along its length, so that a free end 147 of the first leg 142 is bent upwards away from the second leg 143. This improves the guidance of the first leg 142 in the receiving contour 145 of the lever element 129.

Figure 12:
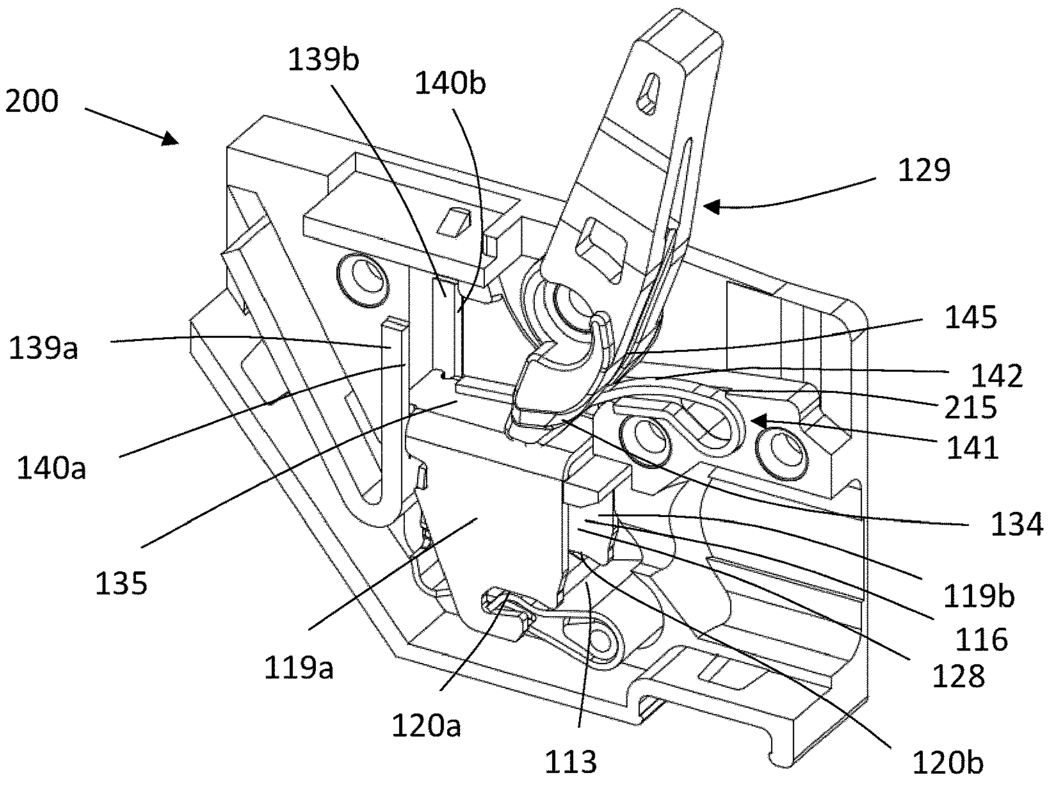
FIG. 12 shows a schematic perspectival representation of the connection clamp shown in FIG. 11.

The second leg 143 of the restoring spring 141 serves as a holding leg, in that the second leg 143 is fixedly arranged. As can be seen in FIG. 12, both the second leg 143 and the arcuate section 144 of the restoring spring 141 are supported on an inner contour 215 of the housing 210. This inner contour 215 can be in the form of a receiving pocket.

Figure 10:
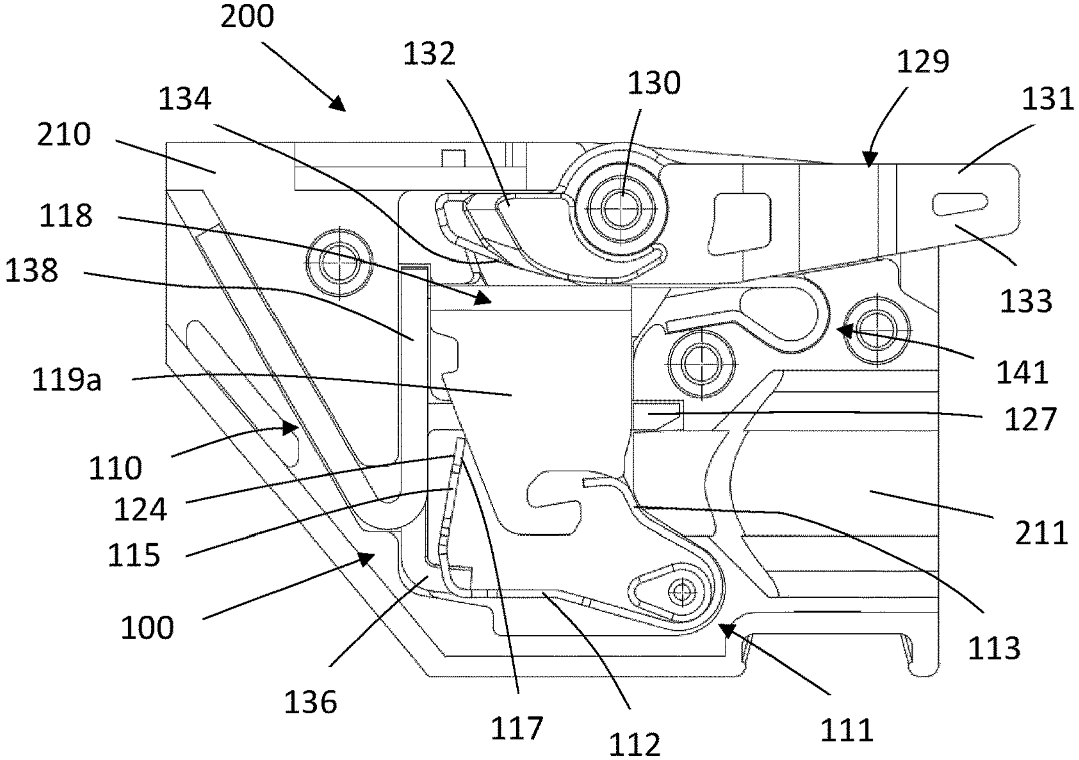
FIG. 10 shows a schematic representation of another connection clamp according to the invention, with the clamping spring in a clamping position.
Figure 11:
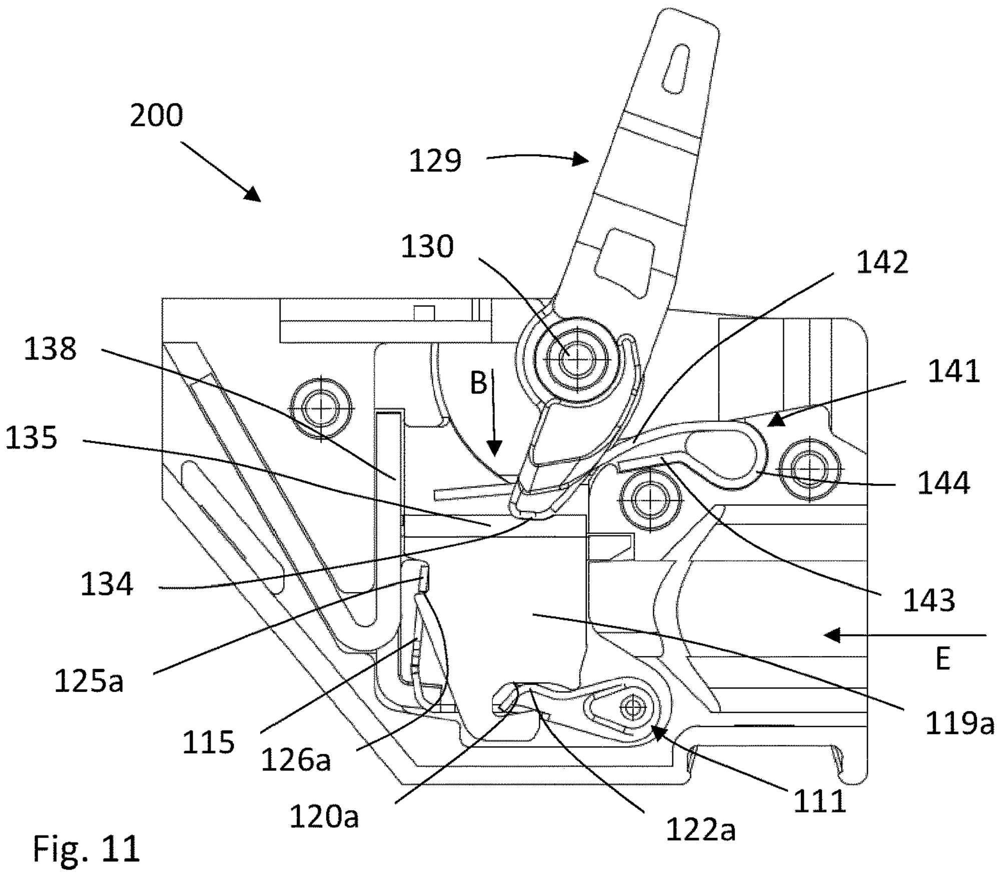
FIG. 11 shows a schematic representation of the connection clamp shown in FIG. 10, with the clamping spring in the open position.

In contrast, the first leg 142 of the restoring spring 141 is movable relative to the second leg 143 in order to be able to interact with the lever element 129 and to be able to load the lever element 129 in the open position. In the case of a rotational movement of the lever element 129 from the closed position, which is shown in FIG. 10, into the open position, which is shown in FIGS. 11 and 12, the rotational movement of the lever element 129 causes the first leg 142 to be carried along and deflected towards the second leg 143 by the lever element 129, so that a spring load arises within the first leg 142, and said spring load loads the lever element 129. In the case of a movement of the lever element 129 back into the closed position, the first leg 142 presses against the lever element 129 by virtue of the spring load of the first leg, and, as a result, the lever element automatically rotates back into the closed position.

The second leg 143 of the restoring spring 141 has a substantially shorter length than the first leg 142 of the restoring spring 141.

Figure 13:
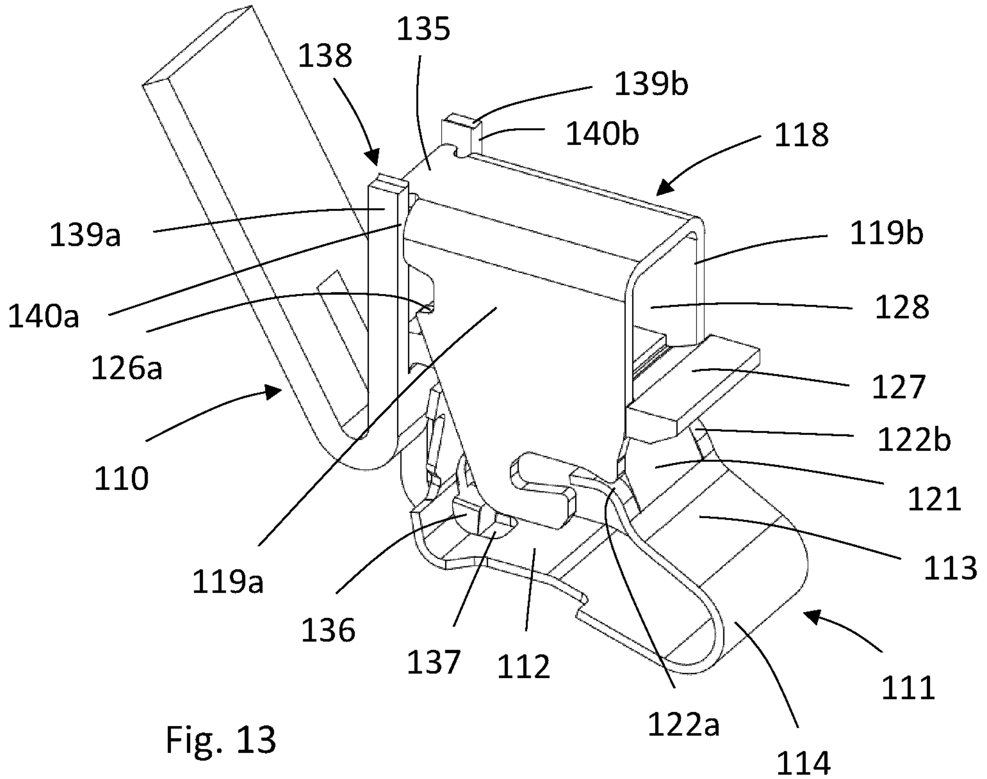
FIG. 13 shows a schematic representation of the current bar together with the clamping spring and the actuating element according to the embodiment of the connection clamp shown in FIGS. 10 through 12.
Figure 14:
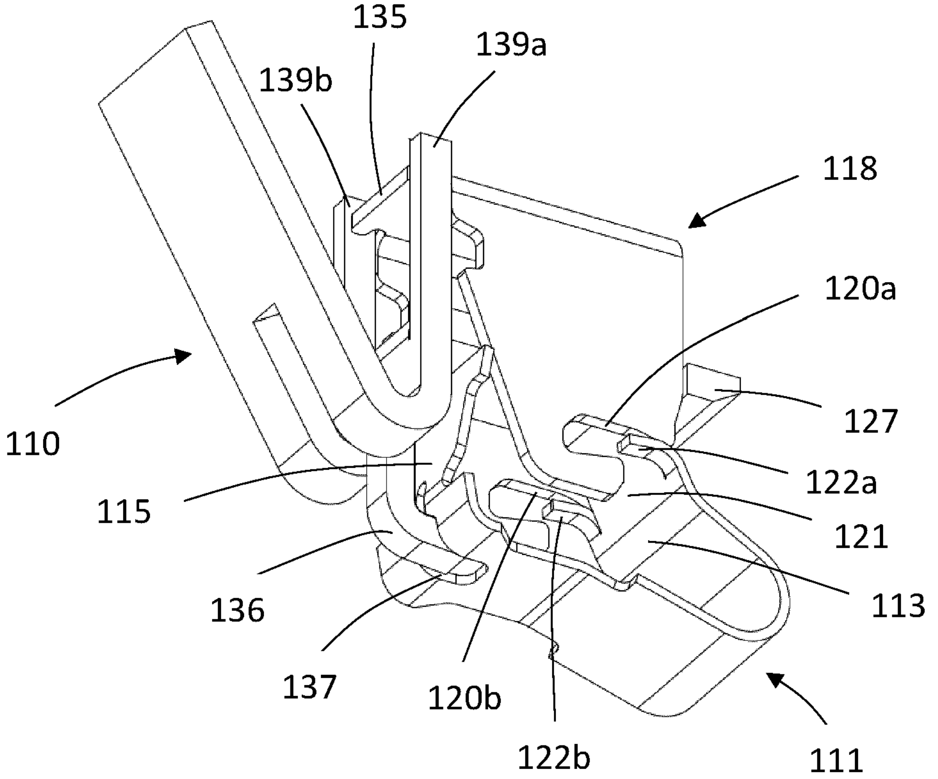
FIG. 14 shows another schematic representation of the current bar together with the clamping spring and the actuating element according to the embodiment of the connection clamp shown in FIGS. 10 through 12.

FIGS. 13 and 14 show the current bar 110, the clamping spring 111, and the actuating element 118 again, alone.

FIG. 15 shows an exploded view of the connection clamp 200, wherein, here, the connection clamp 200 has the restoring spring 141 and the guide section 138 on the current bar 110. However, it is also possible for the connection clamp 200 to have only one of these two features, which are additional to the connection clamp 200 shown in FIGS. 1 through 9.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Connection assembly
110 Current bar
111 Clamping spring
112 Retaining leg
113 Clamping leg
114 Arcuate section
115 Latching leg
116 Conductor connection space
117 Pressure surface
118 Actuating element
119*a*, 119*b* Actuating arm
120*a*, 120*b* Actuating surface
121 Clamping tab
122*a*, 122*b* Side tab
123 Clamping edge
124 Free end
125*a*, 125*b* Holding arm
126*a*, 126*b* Holding contour
127 Clamping section
128 Free space
129 Lever element
130 Axis of rotation
131 First end section
132 Second end section
133 Handle section
134 Actuating surface
135 Connecting web
136 Holding section
137 Opening
138 Guide section
139*a*, 139*b* Guide web
140*a*, 140*b* Guide surface
141 Restoring spring
142 First leg
143 Second leg
144 Arcuate section
145 Receiving contour
146 Bend
147 Free end
200 Connection clamp
210 Housing
211 Conductor insertion opening
212 First housing part
213 Second housing part
214 Latching connection
215 Inner contour
D1 First pressure force
D2 Second pressure force
B Actuation direction
E Conductor insertion direction

The invention claimed is:

1. A connection assembly for connecting an electrical conductor, comprising:

a current bar;

a clamping spring having a holding leg and a clamping leg, the conductor to be connected being clampable against a clamping section of the current bar by the clamping leg, with the clamping spring in a clamping position;

an actuating element linearly guidable along an actuation direction and by which the clamping spring is transferrable from the clamping position into an open position, the actuating element being braced, in the open position, with the clamping spring and holding the clamping spring in the open position; and a rotatably-mounted lever element configured to act upon the actuating element to actuate the actuating element, wherein, to form the bracing, the clamping spring, in the open position, is configured to apply to the actuating element a first pressure force acting counter to the actuation direction of the actuating element and a second pressure force acting in the actuation direction of the actuating element.

2. The connection assembly of claim 1, wherein, in the open position, the first pressure force is applied to the actuating element by the clamping leg of the clamping spring, wherein the clamping leg has a clamping tab and at least one side tab arranged laterally to the clamping tab, and wherein a clamping edge configured to clamp the conductor to be connected against the current bar in the clamping position is formed on a free end of the clamping tab, and the first pressure force is applied to the actuating element by the at least one side tab in the open position.

3. The connection assembly of claim 1, wherein the actuation direction of the actuating element is formed transversely to a conductor insertion direction of the conductor to be connected into a conductor connection space formed between the current bar and the clamping spring.

4. The connection assembly of claim 1, wherein the lever element has an axis of rotation arranged off-center with respect to a length of the lever element.

5. The connection assembly of claim 1, wherein the actuating element has a connecting web extending transversely to the actuation direction, and wherein the lever element is configured to roll on the connecting web during rotational movement of the lever element.

6. An electronic device, comprising:

at least one connection assembly of claim 1; and/or at least one connection clamp, comprising:

a housing; and the at least one connection assembly arranged in the housing.

7. The connection assembly of claim 1, wherein a latching leg is arranged on the holding leg of the clamping spring and is configured to apply, in the open position, the second pressure force to the actuating element.

8. The connection assembly of claim 7, wherein the latching leg has a pressure surface, and wherein, to transfer the clamping spring from the open position into the clamping position, the pressure surface is actuatable by the conductor to be connected, and the latching leg is configured to be brought out of engagement with the actuating element by actuation of the pressure surface.

9. The connection assembly of claim 8, wherein a holding contour configured to hold the latching leg on the actuating element in the open position of the clamping spring is formed on the actuating element.

10. The connection assembly of claim 9, wherein the actuating element has at least one actuating arm extending in the actuation direction, and wherein the holding contour is formed on the at least one actuating arm.

11. The connection assembly of claim 1, further comprising:

a restoring spring configured to interact with the lever element.

12. The connection assembly of claim 11, wherein the restoring spring comprises a leg spring having a first leg and a second leg connected to the first leg by an arcuate section, and wherein the first leg of the restoring spring engages, in a form-fit, in a receiving contour formed on the lever element.

13. The connection assembly of claim 1, wherein the current bar has a holding section formed at a distance from the clamping section, and wherein the clamping spring is held on the holding section.

14. The connection assembly of claim 13, wherein the clamping spring has an opening into which the holding section of the current bar is inserted.

15. The connection assembly of claim 1, wherein the current bar has a guide section which extends in the actuation direction and on which the actuating element is guided.

16. The connection assembly of claim 15, wherein the guide section has a first guide bar and a second guide bar extending parallel to the first guide bar, and wherein the actuating element is guided, at least in parts, between the first guide bar and the second guide bar.

17. A connection clamp, comprising:

a housing; and at least one connection assembly of claim 1 arranged in the housing.

18. The connection clamp of claim 17, wherein the lever element is mounted on the housing by an axis of rotation of the lever element.

19. The connection clamp of claim 17, wherein the housing comprises a two-part design.

* * * * *